United States Patent [19]
Jacobs et al.

[11] Patent Number: 5,986,904
[45] Date of Patent: Nov. 16, 1999

[54] SELF-REGULATING LOSSLESS SNUBBER CIRCUIT

[75] Inventors: Mark Elliott Jacobs; Hengchun Mao, both of Dallas, Tex.

[73] Assignee: Lucent Technologies, Inc., Murray Hill, N.J.

[21] Appl. No.: 09/186,539

[22] Filed: Nov. 5, 1998

[51] Int. Cl.[6] .................................................. H02M 7/06
[52] U.S. Cl. ............................... 363/53; 363/17; 363/126
[58] Field of Search .................................. 363/17, 50, 52, 363/53, 55, 56, 57, 58, 39, 40, 44, 45, 46, 98, 132, 126; 361/91.7

[56] References Cited

U.S. PATENT DOCUMENTS

| | | | |
|---|---|---|---|
| 4,853,836 | 8/1989 | Furuhashi | 363/58 |
| 5,351,179 | 9/1994 | Tsai et al. | 363/53 |
| 5,379,206 | 1/1995 | Davidson | 363/55 |

*Primary Examiner*—Y. J. Han
*Attorney, Agent, or Firm*—Locke Liddell & Sapp LLP

[57] ABSTRACT

A lossless snubber circuit is described for use with power converters, particularly asymmetric half-bridge converters. The snubber circuit provides a clamping circuit which has a clamping diode and a clamping capacitor connected across each of the rectifier diodes in the power converters output circuit. The clamping diode and clamping capacitor act to clamp the voltage across the rectifier diode and to recover the reverse recovery energy from the rectifier diode's turn-off. The reverse recovery energy is then transferred back to the input capacitors of the converter's input circuit through an energy recovery circuit. The energy recovery circuit includes a recovery switch which regulates the operation of the snubber circuit and a commutation transformer which provides the path from the snubber circuit to the input circuit. The snubber circuit allows the clamping voltage of the clamping capacitor to be adjusted to accommodate changes in the converter's conditions.

21 Claims, 6 Drawing Sheets

5,986,904

SELF-REGULATING LOSSLESS SNUBBER CIRCUIT

This invention relates to snubber circuits for power converter circuits. More specifically, the invention relates to self-regulating lossless snubber circuits for asymmetric half-bridge converters.

BACKGROUND OF THE INVENTION

Half-bridge converters are often attractive for medium-power power supplies because of their ability to provide zero-voltage turn-on for the primary switches. The rectifier diodes, or blocking diodes, in a half-bridge converter, however, can be responsible for energy loss and voltage ringing due to the reverse recovery of the blocking diodes, since the blocking diodes often have to block a higher voltage than the blocking diodes of full-bridge converters. This can be particularly true in asymmetric half-bridge converters, where one of the blocking diodes can be forced to block a comparably much higher voltage. Snubber circuits are usually required to reduce the voltage ringing. Simple RC (resistor/capacitor) or RCD (resistor/capacitor/diode) snubbers have too much power loss, since any energy received by the snubber is dissipated in the resistor. Saturable inductors can be used to limit the di/dt through the diodes, and thus reduce the reverse recovery energy. Saturable inductors, however, present thermal management problems at high ambient temperatures.

Asymmetric half-bridge converters present additional difficulties for snubber design because the two rectifier diodes in the output circuit have different voltages, and these voltages change with input voltage and switch duty cycles. A good snubber should be self-regulating, that is it should be able to track the voltage change of the diodes automatically, and thus change the clamping voltages accordingly. The automatic tracking of the clamp voltages can also eliminate the current overshoot due to the charging of the clamping capacitors. This aids current sensing at the output of the converter for current mode control and over-current protection. Additionally, the snubber is preferably composed of components with very low ESL (equivalent series inductance) in order to clamp the very fast rate rise of voltage due to the reverse recovery diode current.

SUMMARY OF THE INVENTION

The present invention provides a lossless snubber circuit for use with power converter circuits, particularly asymmetric half-bridge converters. The snubber circuit includes a clamping circuit and an energy recovery circuit. The clamping circuit is formed by a clamping diode and a clamping capacitor connected across each of the rectifier diodes. The clamping diode and the clamping capacitor act to clamp the voltage across the rectifier diode and to store the reverse recovery energy created when the rectifier diode turns off. The energy recovery circuit is connected to the clamping circuit and includes a recovery switch to regulate the snubber circuit and at least one commutation transformer to couple the energy recovery circuit to the input circuit. The recovery switch when closed allows the energy in the clamping capacitors to be returned to the input capacitors in the input circuit through the commutation transformers. Additionally, the coupling of the clamping circuit to the input circuit allows the voltage stress across the rectifier diodes to be optimized.

The features and advantages of the invention will become more readily understood from the following detailed description taken in conjunction with the appended claims and attached drawing wherein:

DESCRIPTION OF THE PREFERRED EMBODIMENTS

Figure 1:
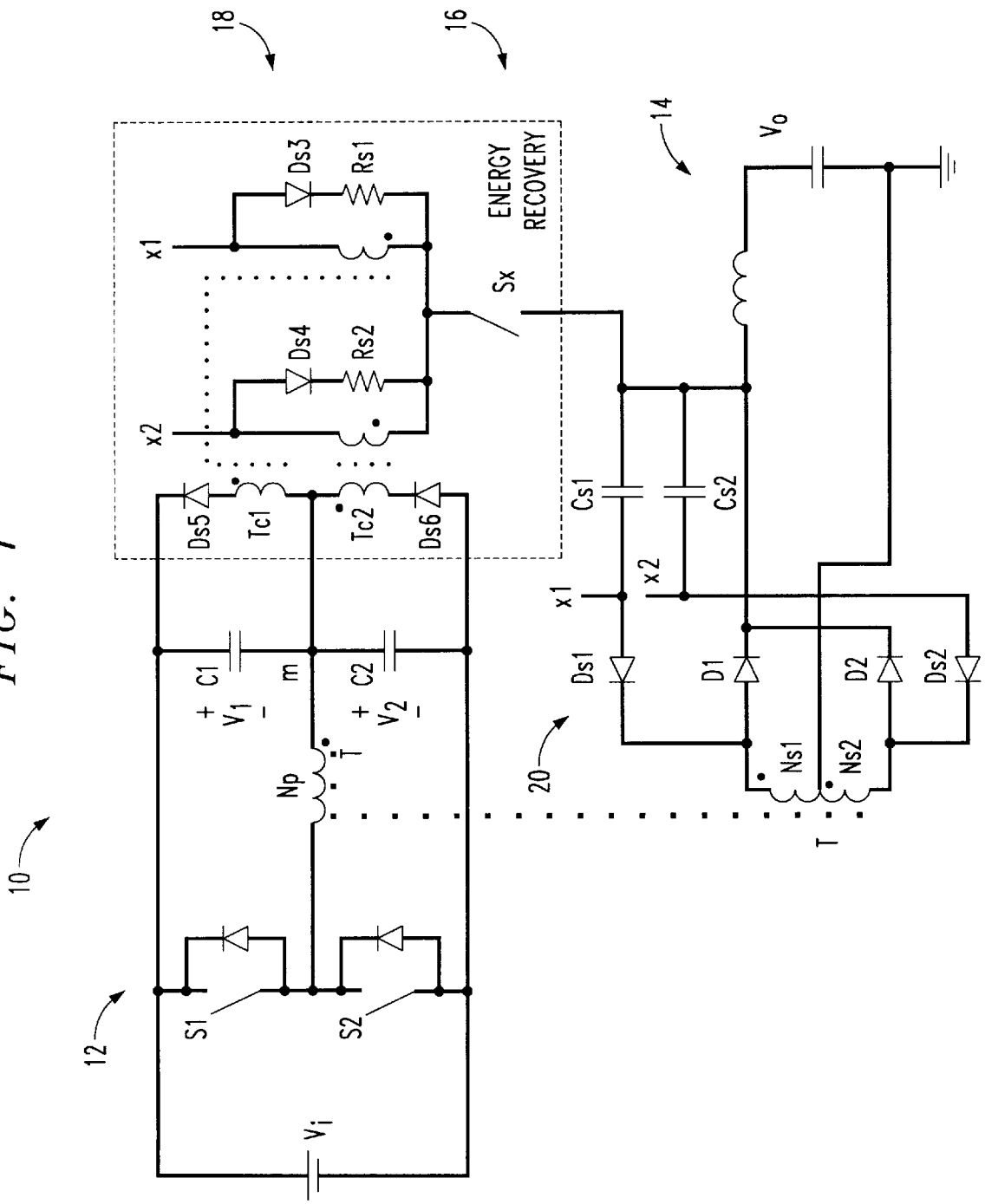
FIG. 1 is a circuit diagram of a half-bridge converter with a self-regulating lossless snubber circuit according to the present invention.
Figure 2:
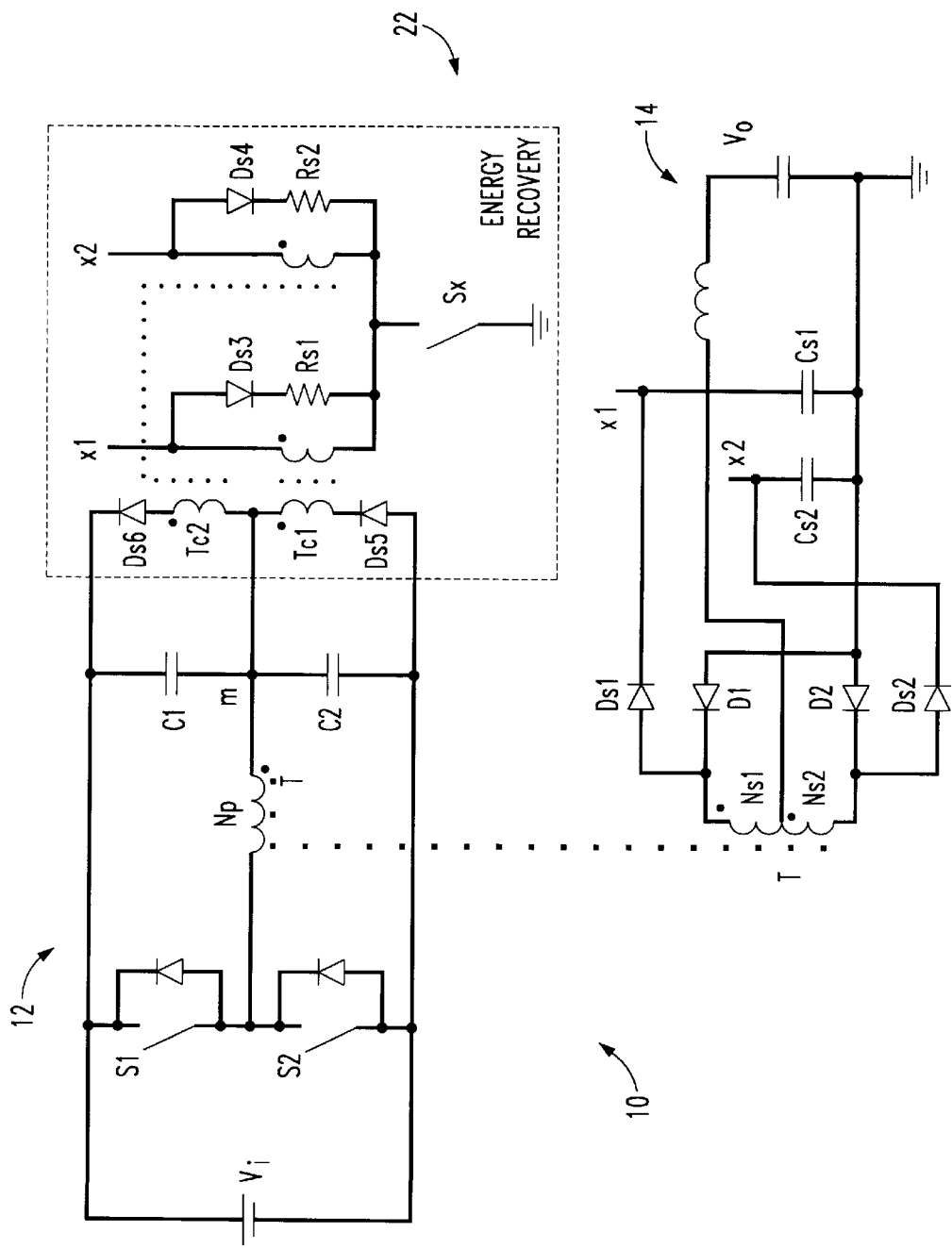
FIG. 2 is a circuit diagram of an alternate embodiment of a lossless snubber circuit according to the present invention.

Referring to FIGS. 1 and 2, the preferred embodiments of the present invention are shown with an asymmetric half-bridge converter configuration. Circuit 10 is formed by input circuit 12, output circuit 14 and snubber circuit 16. Snubber circuit 16 is broken into clamping circuit 20 and energy recovery circuit 18. Input circuit 12 and output circuit 14 of FIG. 1 show a half-bridge converter circuit which is used to provide a regulated output voltage $V_o$ from input voltage $V_i$. Input circuit 20 of circuit 10 is used to place either voltage $V_1$ or voltage $V_2$ across primary winding $N_p$ of power transformer T. Voltages $V_1$ and $V_2$ are formed by the half-bridge capacitors C1 and C2 which divide input voltage $V_i$ into two parts. Switches S1 and S2 are controlled by a pulse width modulated ("PWM") controller (not shown) which varies their duty cycle to regulate power at the load. In this case when switch S2 is closed $V_2$ is placed across primary winding $N_p$ which induces a current in winding $N_{s1}$ causing rectifier diode D1 of output circuit 14 to be forward biased. Conversely, when switch S1 is closed, $-V_1$ is placed across primary winding $N_p$ causing current to be induced in winding $N_{s2}$ which forward biases rectifier diode D2 of output circuit 14.

Losses associated with rectifier diodes D1 and D2 of the asymmetric half-bridge converter circuit formed by input circuit 12 and output circuit 14 occur primarily during the period where the diode is changing states from nonconducting to conducting. When the rectifier diodes are reversed biased, a momentary reversal of current flowing in the rectifier diode will occur before the rectifier diode will stop conducting. This reverse brief current in the rectifier diode will cause a momentary short in power transformer T. This momentary current in the rectifier diode is referred to as reverse recovery current or reverse recovery energy. In addition to the problems associated with reverse recovery currents, the asymmetric half-bridge converter poses additional problems in that rectifier diodes D1 and D2 have different voltages, and these voltages change with input voltage and switch duty cycles.

Clamping circuit 20 of snubber circuit 16 acts to clamp rectifier diodes D1 and D2 voltages during turn-off, and recover the reverse recovery energy into clamping capacitors $C_{s1}$ and $C_{s2}$. Clamping circuit 20 is formed by connecting clamping diode $D_{s1}$ and clamping capacitor $C_{s1}$ across rectifier diode D1. Similarly, clamping diode $D_{s2}$ and clamping capacitor $C_{s2}$ are connected across rectifier diode D2. Clamping circuit 20 operates such that when rectifier diode D1 turns off after its reverse conduction mode, its reverse recovery current is picked up by clamping diode $D_{s1}$ and flows through clamping capacitor $C_{s1}$. Clamping capacitor $C_{s1}$ is designed to be large enough so that its voltage does not change significantly due to the reverse recovery current flowing in one switching cycle. The voltage of rectifier diode D1 is therefore clamped at the voltage of clamping capacitor $C_{s1}$. Further, the reverse recovery energy of rectifier diode D1, which is also the leakage inductance energy of the transformer charged by the diode reverse recovery current, is transferred to clamping capacitor $C_{s1}$ where the energy can be recovered and returned to the circuit as will be discussed further below. The reverse recovery current of rectifier diode D2 occurring when rectifier diode D2 turns off after its reverse conduction mode, flows through clamping diode $D_{s2}$ and is similarly stored in clamping capacitor $C_{s2}$.

Energy recovery circuit 18 transfers the reverse recovery energy stored in the clamping capacitors to the input side of power transformer T. Energy recovery circuit 18 is formed by commutation transformers $T_{c1}$ and $T_{c2}$ which couple energy recovery circuit 18 to input circuit 12, recovery diodes $D_{s5}$ and $D_{s6}$ connected to the input circuit side of commutation transformers $T_{c1}$, and $T_{c2}$, resistors $R_{s1}$ and $R_{s2}$ and diodes $D_{s3}$ and $D_{s4}$ which act as reset circuitry, and recovery switch $S_x$. Energy recovery circuit 18 is connected to clamping circuit 20 through recovery switch $S_x$ and through energy feedback paths $X_1$ and $X_2$.

When recovery switch $S_x$ is turned on, the voltages of clamping capacitors $C_{s1}$ and $C_{s2}$ will charge the commutation transformers $T_{c1}$, and $T_{c2}$. Energy will be transferred to half-bridge capacitors C1 and C2 until each clamping capacitor voltage is discharged lower than the reflected voltage of the corresponding half-bridge capacitor. For example, if the voltage of clamping capacitor $C_{s1}$ is higher than the reflected voltage of C1, a current will flow through recovery diode $D_{s5}$ as the voltage difference charges the leakage inductance of commutation transformer $T_{c1}$ when recovery switch $S_x$ is turned on, thereby transferring energy recovered from the reverse recovery current from clamping capacitor $C_{s1}$ to half-bridge capacitor C2. This transfer of energy will reduce the voltage across clamping capacitor $C_{s1}$ until the voltage across clamping capacitor $C_{s1}$ becomes lower than the reflected value of the voltage across C1, at which time the current through recovery diode $D_{s5}$ will decrease until recovery diode $D_{s5}$ becomes reverse biased and the energy transfer stops. Energy is also transferred from clamping capacitor $C_{s2}$ to half-bridge capacitor C2 through recovery diode $D_{s6}$ in the same manner.

After both recovery diodes $D_{s5}$ and $D_{s6}$ stop conduction, recovery switch $S_x$ can be turned off, and the magnetizing currents of commutation transformers $T_{c1}$ and $T_{c2}$ will be conducted through diodes $D_{s3}$ and $D_{s4}$ and resistors $R_{s1}$ and $R_{s2}$. The commutation transformers are then reset by diodes $D_{s3}$ and $D_{s4}$ and resisters $R_{s1}$ and $R_{s4}$. The duty cycle of recovery switch $S_x$, therefore, has very little effect on the voltages of the clamping diodes $C_{s1}$ and $C_{s2}$, and can be fixed to simplify the control and operation of the circuit. The drive signal for recovery switch $S_x$ can be derived from the gate signals for half-bridge switches S1 and S2, or the power transformer T. Generally the duty cycle of recovery switch $S_x$ should be small, for example 2%–5%, to reduce the volt-second requirement of commutation transformers $T_{c1}$ and $T_{c2}$. Additionally, commutation transformers $T_{c1}$ and $T_{c2}$ can be configured to use the same magnetic core. For example, one of the commutation transformers could be wound on one side leg of an EE core, and the other commutation transformer could be wound on the other side leg, so that the center leg of the core can practically decouple the two commutation transformers.

By selecting a proper turns ratio for commutation transformers $T_{c1}$ and $T_{c2}$ the voltages of half-bridge capacitors C1 and C2 can be the same as the steady state voltages of rectifier diodes D1 and D2, respectively, so that the voltage stresses of D1 and D2 are minimized. Further, the energy transfer between half-bridge capacitors C1 and C2 and clamping capacitors $C_{s1}$ and $C_{s2}$ allows the clamping capacitors to adjust to account for changes in the rectifier diode voltages as a result of changes in the input voltage and switch duty cycles.

Recovery switch $S_x$ in snubber circuit 16 in FIG. 1 is not connected to the ground which makes the gate drive circuit more complex. Referring now to FIG. 2, an alternative snubber circuit 22 is shown in which recovery switch $S_x$, and clamping capacitors $C_{s1}$ and $C_{s2}$ are connected to the ground instead of output circuit 14. This rearrangement of the elements in the clamping circuit of alternative snubber circuit 22, as well as the connection of recovery switch $S_x$ to ground simplifies the gate drive for recovery switch $S_x$.

Figure 3:
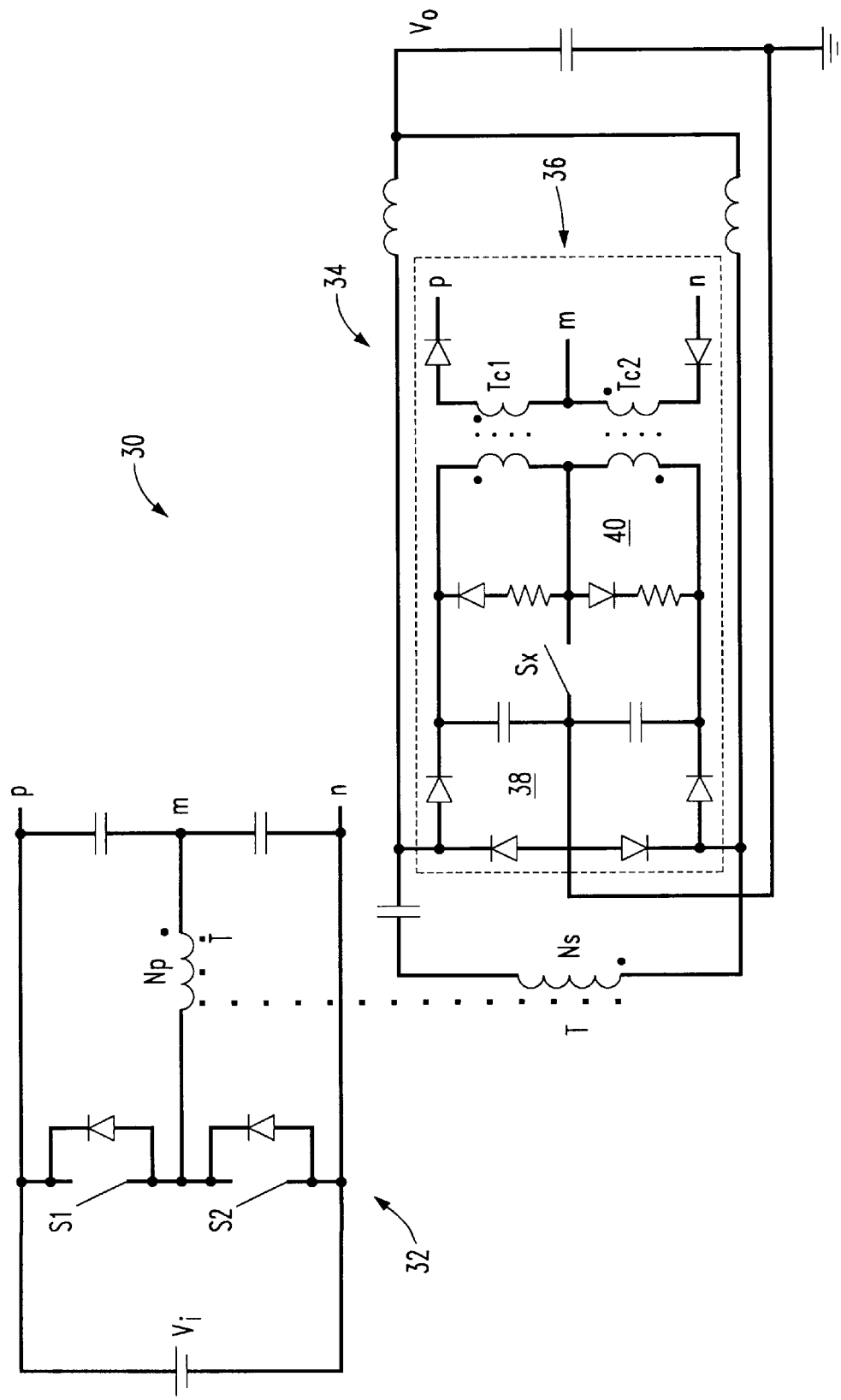
FIG. 3 is a circuit diagram of a self-regulating lossless snubber circuit according to the present invention adapted for use with an asymmetric half-bridge converter with a current doubler.

Referring now to FIG. 3, converter circuit 30 shows the present invention implemented with a current doubler. Converter circuit 30 employs an asymmetric input circuit 32 coupled to a current doubler output circuit 34 through transformer T. Snubber circuit 36 is again formed by clamping circuit 38 and energy recovery circuit 40. Energy recovery circuit 40 is coupled to input circuit 32 through connections m, n, and p. Snubber circuit 36 operates essentially identically to snubber circuit 16 and 22 described with respect to FIGS. 1 and 2, respectively.

Figure 4:
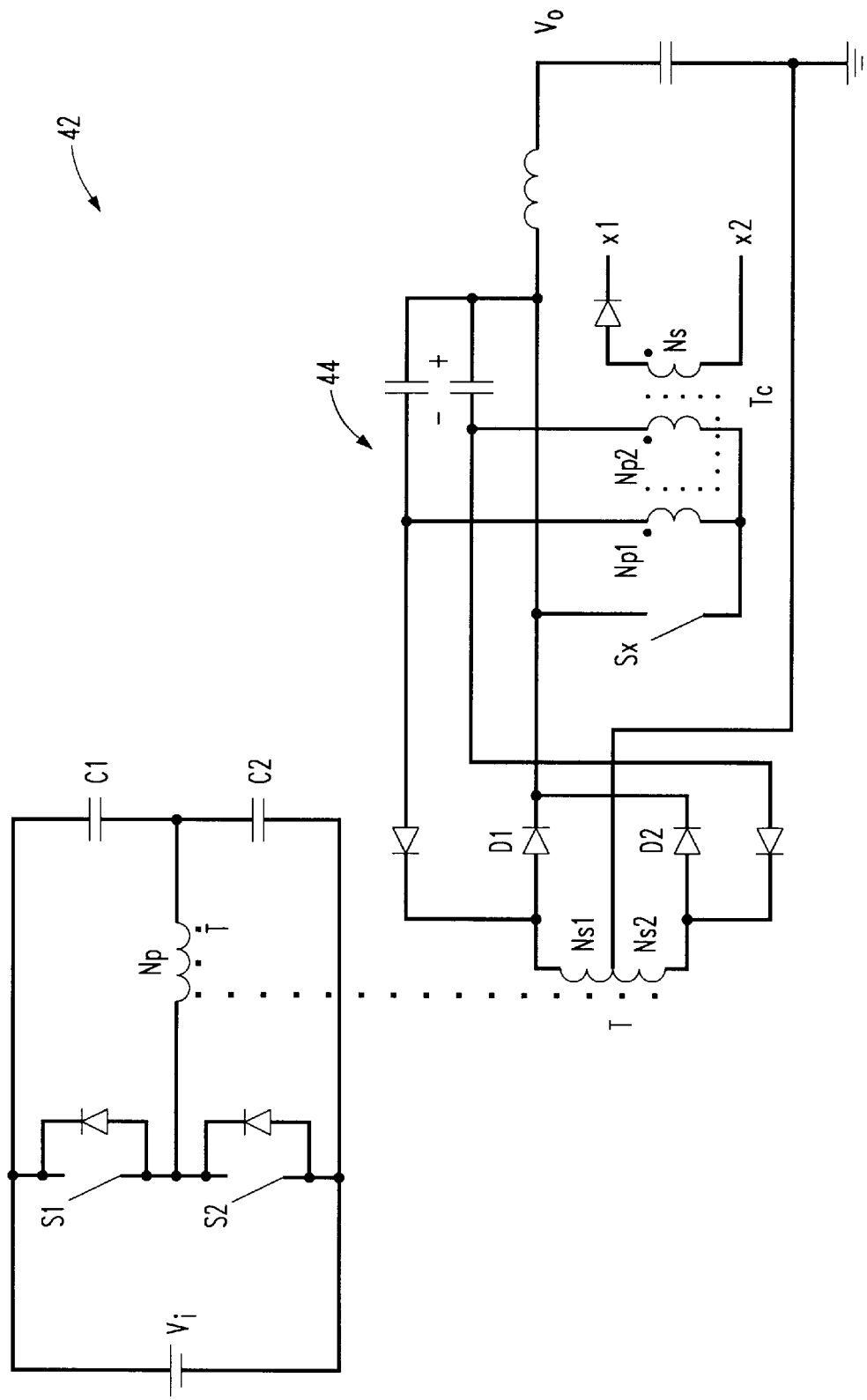
FIG. 4 is a circuit diagram of a simplified snubber circuit according to the present invention.

FIG. 4 shows a converter circuit 42 employing a simplified snubber circuit 44 according to the present invention. Commutation transformers $T_{c1}$ and $T_{c2}$ from FIGS. 1 through 3 are very small because their volt-second and current ratings are low. For applications where the voltage stress of diodes D1 and D2 does not need to be optimized, commutation transformers $T_{c1}$, and $T_{c2}$ from FIGS. 1 through 3 can be combined into one flyback transformer $T_c$ with two primary windings $N_{p1}$ and $N_{p2}$ with one secondary winding $N_s$ as is shown with respect to snubber circuit 44. The energy feedback leads X1 and X2 can be connected to any voltage source, such as the output voltage, the input voltage, or one or both of the two input capacitors C1 and C2.

Figure 5:
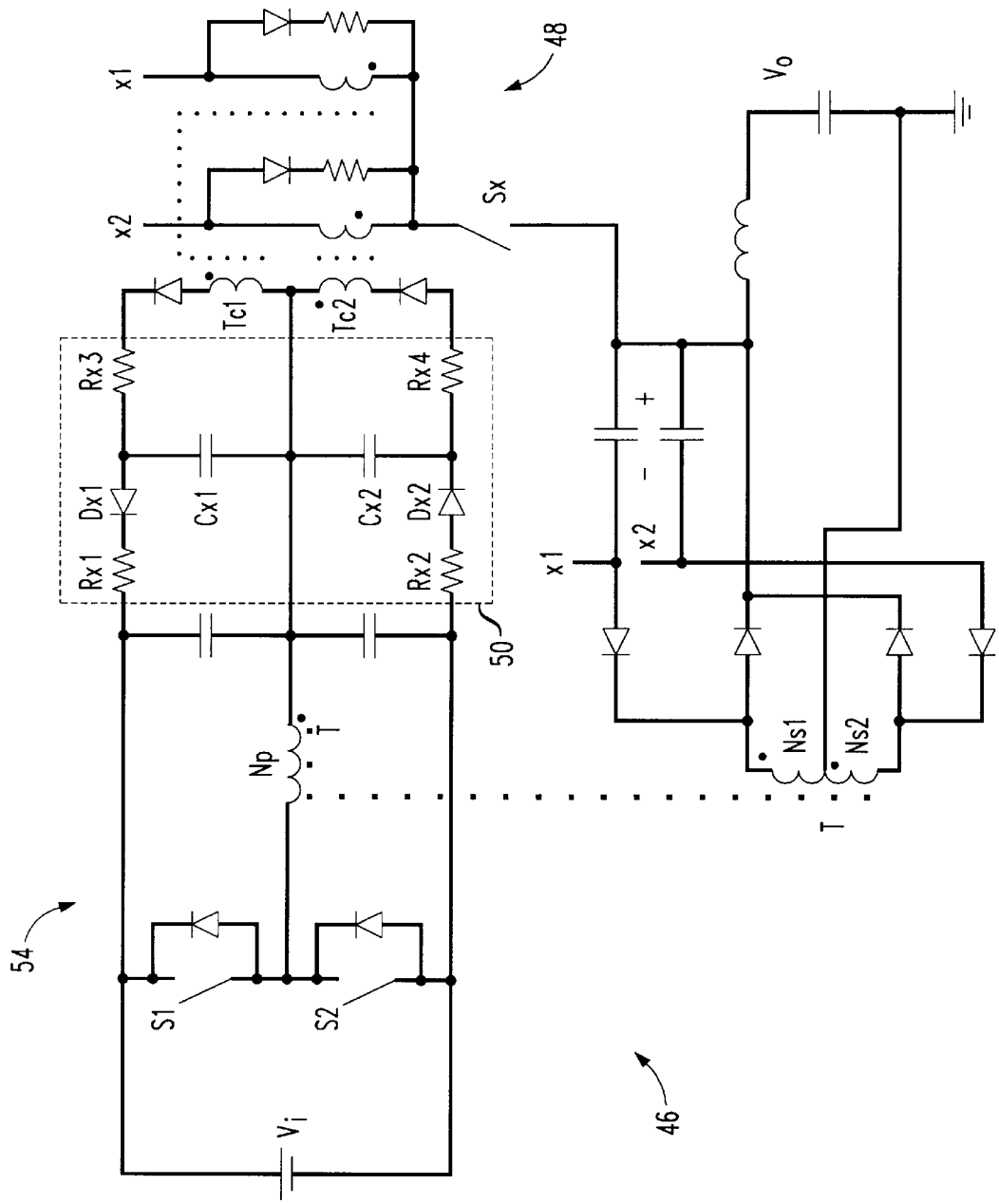
FIG. 5 is a circuit diagram of a self-regulating lossless snubber circuit with EMI and current peak limit circuit.

The currents of snubber circuits 16, 22, 36, and 44 from FIGS. 1 through 4, respectively, are usually highly pulsating. Referring now to FIG. 5, the electromagnetic interference ("EMI") noise from these snubber circuits can be reduced with an optional buffer, or filter, circuit 50 used in conjunction with snubber circuit 48. In converter circuit 46, the energy transferred from snubber circuit 48 is first stored in buffer capacitors $C_{x1}$ and $C_{x2}$, and then transferred to input circuit 54 through buffer diodes $D_{x1}$ and $D_{x2}$ and buffer resistors $R_{x1}, R_{x2}, R_{x3}$ and $R_{x4}$. As a result, the input circuit will be decoupled from the high-frequency current pulse of snubber circuit 48. Buffer resistors $R_{x3}$ and $R_{x4}$ are optional, but act to limit the current peak of recovery switch $S_x$ during transients where the leakage inductance of commutation transformers $T_{c1}$ and $T_{c2}$ is not enough.

Figure 6:
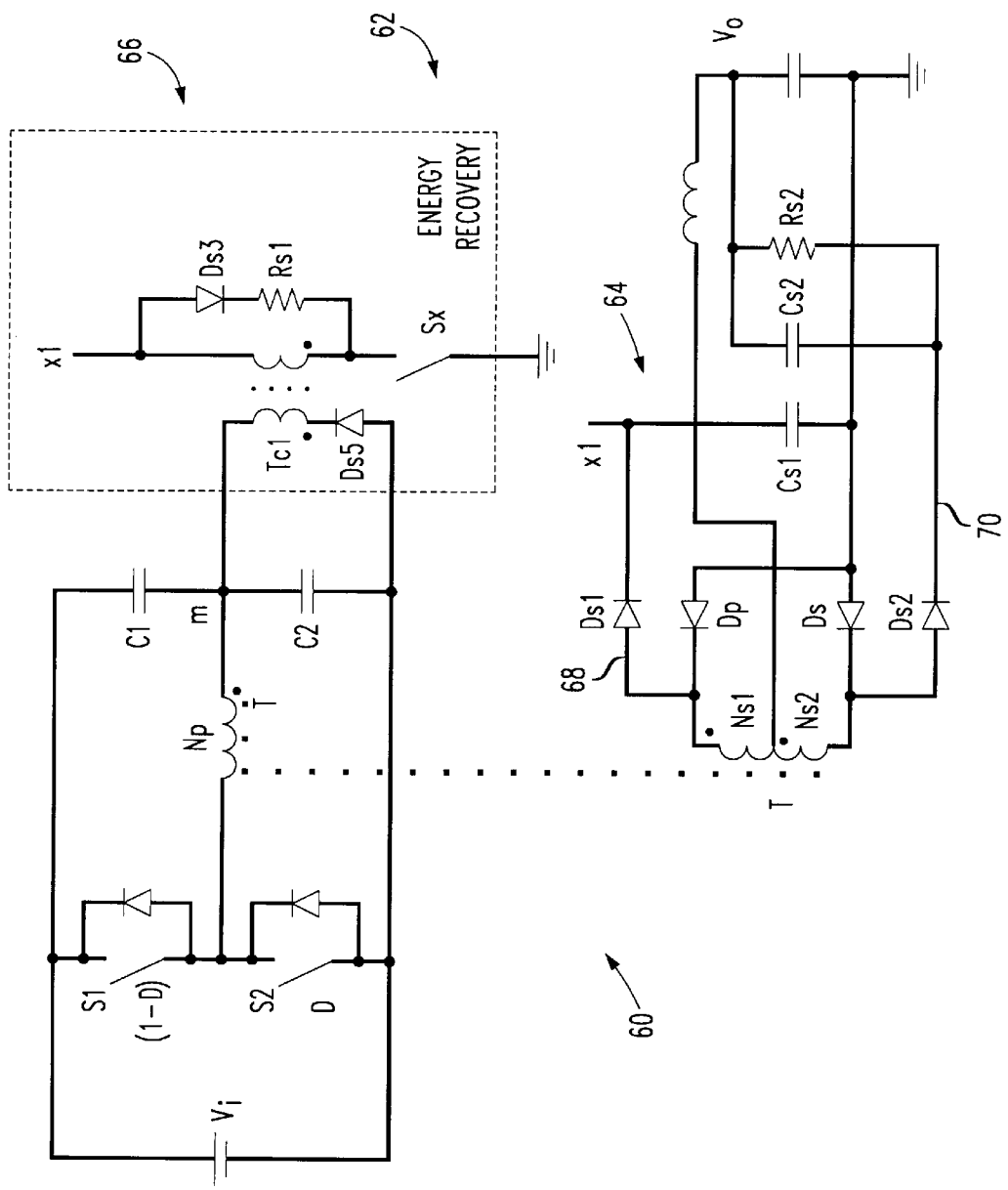
FIG. 6 is a circuit diagram of a hybrid snubber circuit for asymmetric half-bridge converters.

In the converter circuits of FIGS. 1 through 5, the snubber circuit is applied to both rectifier diodes D1 and D2, so the converter efficiency and rectifier diode stress can be optimized. The snubber circuits of FIGS. 1 through 5, however, are relatively complex, especially if the commutation transformers have to provide high-voltage isolation. A simplified snubber circuit 62 is shown for converter 60 of FIG. 6. Snubber circuit 62 employs a clamping circuit 64 in which includes a lossless snubber 68 for primary rectifier diode $D_p$ and a lossy snubber 70 for secondary rectifier diode $D_s$. This simplified approach is useful because of the properties of the asymmetric half-bridge converter configuration of converter circuit 60. In the asymmetric half-bridge configuration, one of the rectifier diodes, here primary rectifier diode $D_p$, must block a higher voltage than secondary rectifier diode $D_s$. Since primary rectifier diode $D_p$ blocks a higher voltage than secondary rectifier diode $D_s$, most of the losses associated with the reverse recovery current will occur with primary blocking diode $D_p$.

Instead of being connected to energy recovery circuit 66, lossy snubber 70 is connected to the output voltage $V_o$. Because the blocking voltage of secondary rectifier diode $D_s$ is usually slightly higher than output voltage $V_o$, the steady-state voltage of $C_{s2}$ is usually small, so most of the reverse recovery energy of secondary rectifier diode $D_s$ is transferred to the output. The remainder of the energy from clamping capacitor $C_{s2}$ is dissipated in resister $R_{s2}$. This configuration allows the circuit to maintain a high efficiency. The higher voltage of primary rectifier diode $D_p$ does not allow for the use of a configuration like that of lossy snubber 70. Instead, primary rectifier diode $D_p$ employs an active lossless snubber such as lossless snubber 68. Lossless snubber 68 operates like snubber circuit 16 described with respect to FIG. 1. As with snubber circuit 16, commutation transformer is connected to input capacitor C2 to minimize the voltage stress on primary rectifier diode $D_p$.

It should be noted that the voltage across clamping capacitor $C_{s2}$ depends on converter circuit 60's operating point, because the reverse recovery energy changes with diode temperature and output current. As a result, the voltage stress on secondary rectifier diode $D_s$ cannot be optimized using lossy snubber 70, though this is not a significant shortcoming since the voltage stress on secondary rectifier diode $D_s$ is low.

All of the elements shown in FIGS. 1, 2, 3, 4, 5 and 6 are standard electrical components, and are commonly available. The switches used can be any appropriate switch with a sufficient switching speed, such as power MOSFETs or power IGBTs. PWM controllers are also well known in the art, and could be any standard PWM controller, such as any of the UC1844 family of PWM control ICs from Unitrode Integrated Circuits, Merrimack, N.H.

The foregoing has outlined preferred and alternative features of the present invention so that those skilled in the art may better understand the detailed description of the invention. Those skilled in the art shall appreciate that they can readily use the disclosed conception and specific embodiment as a basis for designing or modifying other structures for carrying out the same purposes as the present invention. Those skilled in the art should also realize that such equivalent constructions do not depart from the spirit and scope of the present invention in its broadest form as defined by the appended claims.

What is claimed:

1. A snubber circuit for a converter, the converter including an input circuit, a transformer, and an output circuit having a primary rectifier diode and a secondary rectifier diode, the snubber circuit comprising:

a clamping circuit connected across the primary rectifier diode and including a clamping diode and a clamping capacitor; and an energy recovery circuit including a recovery switch and at least one commutation transformer, the energy recovery circuit being connected to the clamping circuit and the at least one commutation transformer coupling the energy recovery circuit to the input circuit of the converter;

wherein the clamping circuit clamps the voltage across the rectifier diode, and recovers the reverse recovery energy of the rectifier diode into the clamping capacitor, and wherein the energy recovered by the clamping capacitor is transferred to the input circuit by the energy recovery circuit.

2. The snubber circuit of claim 1 wherein the clamping circuit includes a second clamping capacitor and second clamping diode connected across the secondary rectifier diode.

3. The snubber circuit of claim 2 wherein the second clamping capacitor and second clamping diode form a lossless snubber and are connected to the energy recovery circuit and controlled by the recovery switch.

4. The snubber circuit of claim 2 wherein the second clamping capacitor and second clamping diode form a lossy snubber and are connected to the output voltage.

5. The snubber circuit of claim 1 wherein the recovery switch is connected between the clamping circuit and the energy recovery circuit.

6. The snubber circuit of claim 1 wherein the recovery switch is connected between the energy recovery circuit and ground.

7. The snubber circuit of claim 1 wherein the output circuit includes a current doubler.

8. The snubber circuit of claim 1 further comprising a buffer circuit connected between the energy recovery circuit and the input circuit, the buffer circuit operable to decouple the input circuit from the snubber circuit.

9. A snubber circuit for a converter, the converter including an input circuit, a transformer, and an output circuit having two rectifier diodes, the snubber circuit comprising:

a clamping circuit connected across the two rectifier diodes and including a clamping diode and a clamping capacitor connected to each rectifier diode; and an energy recovery circuit including a recovery switch and at least one commutation transformer, the energy recovery circuit connected to the clamping circuit and the at least one commutation transformer coupling the energy recovery circuit to the input circuit of the converter.

10. The snubber circuit of claim 9 wherein the clamping capacitors of the clamping circuit clamp the voltage across the rectifier diodes, and recover the reverse recovery energy of the respective rectifier diodes, and wherein the energy recovered by the clamping capacitors is transferred to the input circuit by the energy recovery circuit.

11. The snubber circuit of claim 9 wherein the recovery switch is connected between the clamping circuit and the energy recovery circuit.

12. The snubber circuit of claim 9 wherein the recovery switch is connected between the energy recovery circuit and ground.

13. The snubber circuit of claim 9 wherein the output circuit includes a current doubler.

14. The snubber circuit of claim 9 further comprising a buffer circuit connected between the energy recovery circuit and the input circuit, the buffer circuit operable to decouple the input circuit from the snubber circuit.

15. The snubber circuit of claim 9 wherein the commutation transformer is a flyback transformer with two primary windings and the energy recovery circuit is connected to a voltage source.

16. A snubber circuit for a converter, the converter including an input circuit having two input switches and two input capacitors, a power transformer, and an output circuit having two rectifier diodes, the snubber circuit comprising:

a clamping diode and a clamping capacitor connected across each rectifier diode which the clamp the voltage across the rectifier diodes, and recover the reverse recovery energy of the respective rectifier diodes; and a recovery switch and at least one commutation transformer connected to the clamping capacitors, the at least one commutation transformer also coupling the clamping capacitors to the input circuit of the converter wherein the energy recovered by the clamping capacitors is transferred to the input circuit through the commutation transformers when the recovery switch is closed.

17. The snubber circuit of claim 16 wherein the recovery switch is connected between the clamping capacitors and the at least one commutation transformer.

18. The snubber circuit of claim 16 wherein the recovery switch is connected between the at least one commutation transformer and ground.

19. The snubber circuit of claim 16 wherein the output circuit includes a current doubler.

20. The snubber circuit of claim 16 further comprising a buffer circuit connected between the at least one commutation transformer and the input circuit, the buffer circuit operable to decouple the input circuit from the snubber circuit.

21. The snubber circuit of claim 16 wherein the commutation transformer is a flyback transformer with two primary windings and is connected to a voltage source.

* * * * *